US012650186B2

(12) United States Patent
Sprygada et al.

(10) Patent No.: US 12,650,186 B2
(45) Date of Patent: Jun. 9, 2026

(54) CONNECTION ARRANGEMENT DEVICE AND METHOD FOR FLUID LINE

(71) Applicant: TI Group Automotive Systems, LLC, Auburn Hills, MI (US)

(72) Inventors: Benjamin Allen Sprygada, Battle Creek, MI (US); Jonathan Brock, Bloomfield Township, MI (US); Matthew Stieber, Grosse Pointe Park, MI (US); Cletus J. Thielen, Shelby Township, MI (US); Alexander Landuyt, Rochester, MI (US); Hans Jensen, Dettingen Unter Teck (DE)

(73) Assignee: TI GROUP AUTOMOTIVE SYSTEMS, LLC, Auburn Hills, MI (US)

( * ) Notice: Subject to any disclaimer, the term of this patent is extended or adjusted under 35 U.S.C. 154(b) by 0 days.

(21) Appl. No.: 18/833,577

(22) PCT Filed: Jan. 28, 2022

(86) PCT No.: PCT/IB2022/050775
§ 371 (c)(1),
(2) Date: Jul. 26, 2024

(87) PCT Pub. No.: WO2023/144587
PCT Pub. Date: Aug. 3, 2023

(65) Prior Publication Data
US 2025/0043892 A1    Feb. 6, 2025

(51) Int. Cl.
*F16L 23/032* (2006.01)
*F16L 41/08* (2006.01)

(52) U.S. Cl.
CPC ........... *F16L 23/032* (2013.01); *F16L 41/086* (2013.01)

(58) Field of Classification Search
CPC ....... F16L 23/032; F16L 23/036; F16L 23/18; F16L 23/024; F16L 23/02; F16L 23/0283; F16L 41/086
See application file for complete search history.

(56) References Cited

U.S. PATENT DOCUMENTS

| | | | | |
|---|---|---|---|---|
| 6,386,593 B1 * | 5/2002 | Slais | ..................... | F16L 23/032 |
| 6,682,100 B2 * | 1/2004 | Wood | ................... | F16L 41/086 |

(Continued)

FOREIGN PATENT DOCUMENTS

| | | |
|---|---|---|
| DE | 10163931 A1 | 7/2003 |
| DE | 102013109233 A1 | 3/2014 |

(Continued)

*Primary Examiner* — William S. Choi
(74) *Attorney, Agent, or Firm* — DICKINSON WRIGHT PLLC

(57) ABSTRACT

A connection arrangement device for making a secure connection with at least one tube in a fluid line includes at least one adapter body having a passage bore with at least two outlets, and a mating block which is formed with at least one component and also has at least one channel receiving the adapter body. The adapter body includes a retention feature formed outside the adapter body and the mating block includes a mating feature formed inside the channel. Further, the retention feature of the adapter body is configured to interact with the mating feature of the mating block when the adapter body is coupled to the channel of the mating block such that the adapter body is securely retained within the channel of the mating block.

20 Claims, 8 Drawing Sheets

(56)                    References Cited

U.S. PATENT DOCUMENTS

| | | | | |
|---|---|---|---|---|
| 7,425,021 B2 * | 9/2008 | Yamanashi | ........... | F16L 41/086 |
| 2011/0214755 A1 * | 9/2011 | Kesler | ................ | F16L 23/0283 |
| 2015/0076810 A1 * | 3/2015 | Tran | | |
| 2019/0063607 A1 * | 2/2019 | Kesler | ................... | F16L 23/032 |
| 2020/0009942 A1 * | 1/2020 | Haefner | | |

FOREIGN PATENT DOCUMENTS

| | | |
|---|---|---|
| EP | 3315843 A1 | 5/2018 |
| KR | 20120088967 A | 8/2012 |
| WO | 2008077013 A2 | 6/2008 |

* cited by examiner

FIG. 5A
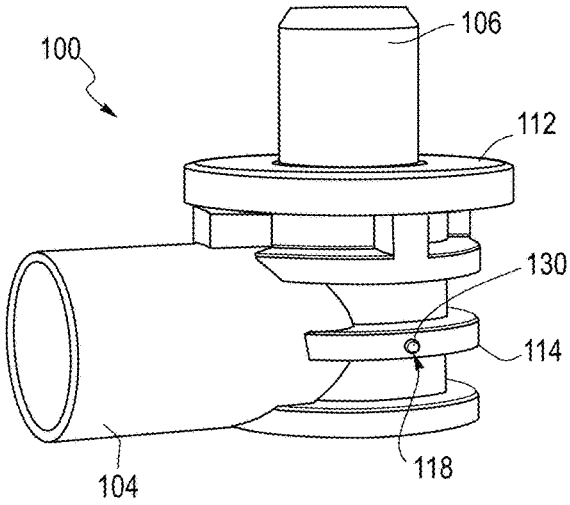
FIG. 5B
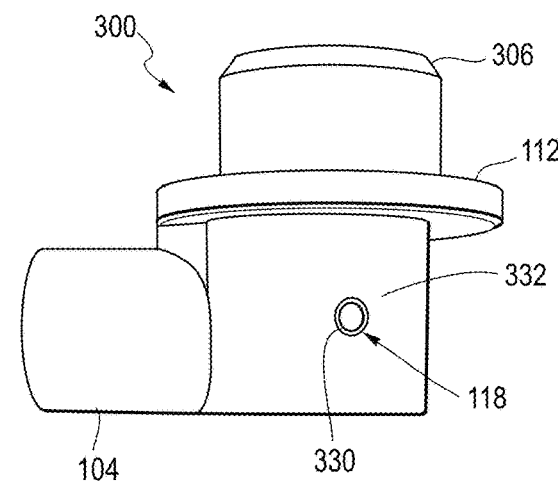
FIG. 5C

CONNECTION ARRANGEMENT DEVICE AND METHOD FOR FLUID LINE

RELATED APPLICATIONS

The present disclosure claims priority to and is a national phase application of PCT Application PCT/IB2022/050775, filed Jan. 28, 2022, the entire contents of which are incorporated herein by reference.

FIELD

The present disclosure relates to a connection arrangement in a fluid line assembly. In particular, the present disclosure relates to the connection arrangement having an adapter with a mating block for making a secure connection in a motor vehicle.

BACKGROUND

The statements in this section merely provide background information related to the present disclosure and may not constitute prior art.

Connection arrangements are generally used in a fluid line assembly in a motor vehicle. In particular, the connection arrangements are used in air conditioning systems, cooling systems (e.g., coolant circuits), valve units, and pump units. The design has to be particularly compact and lightweight in a limited space, and also the pipe or tube connections in the air conditioning systems may be comprised of metallic, rubber, and plastic materials. In addition, the pipe or tubes are attached via adapters, which are provided with sealing elements. Accordingly, it is necessary to connect the adapters firmly and with durable sealing both to the pipe and detachably to a further pipe or to another component in the air conditioning system. However, in addition to high pressures and temperatures, vibrations occur and are transmitted within the components of the air conditioning system. The connection arrangements used in the air conditioning system, therefore, have to be constructed in such a way that a durable connection is provided in spite of vibrations and high pressures, and that fluid leakage cannot occur.

Generally, it is important that the fluid line system such as the air conditioning system in the motor vehicle is constructed to be lightweight and also durable in a limited space. However, we have discovered that the number of fastening means fixing together the components of the fluid line system are limited, and also it is difficult to configure the adapters for providing durable sealing of the connection arrangements for making a secure connection in the fluid line system. To effectively arrange the sealed and secured fluid line in the vehicle, a number of devices and methods for the connection arrangements are continuously developed and used in various fluid line systems.

SUMMARY

The present disclosure relates to a connection arrangement device for making a secure connection with at least one tube in a fluid line. The connection arrangement device of the present disclosure makes it possible to produce a stable and durable connection with a light weight in a fluid line system such as an air conditioning system in a vehicle. According to one aspect of the present disclosure, the connection arrangement device includes at least one adapter body having a passage bore forming a fluid channel with at least two outlets, and a mating block formed with at least one component. Further, the mating block has at least one channel receiving the adapter body. The adapter body includes a retention feature formed outside the adapter body and the mating block includes a mating feature formed in the channel. Further, the retention feature of the adapter body is configured to interact with the mating feature of the mating block when the adapter body is coupled to the channel of the mating block such that the adapter body is securely retained within the channel of the mating block.

According to a further aspect of the present disclosure, the retention feature of the adapter body is formed with a beam type having a fixed end attached to the adapter body and a free end extending from the fixed end with an angle from a flow direction of the second outlet such that the beam retention feature is engaged with the mating feature when the adapter body is retained within the channel of the mating block. The mating feature of the mating block is formed as a groove on an inner surface of the channel to receive the beam retention feature of the adapter body such that the adapter body is securely retained within the channel of the mating block.

According to a further aspect of the present disclosure, the retention feature of the adapter body includes at least one protrusion formed on an outer surface of the adapter body such that at least one protrusion is engaged with the mating feature of the mating block when the adapter body is retained within the channel of the mating block. The mating feature of the mating block includes at least one hole sized to be engaged with the protrusion of the adapter body such that the adapter body is securely retained within the channel of the mating block.

According to a further aspect of the present disclosure, the mating block is formed with two components such as an insert and an outer body. The insert is formed of a metallic material such as an aluminum and the outer body is formed of a polymer material such that the outer body is overmolded to the insert to form the mating block. The outer body of the mating block is formed with the mating feature to receive the retention feature of the adapter body.

According to a further aspect of the present disclosure, the adapter body includes the first outlet and the second outlet formed in a straight-flow direction or angled to change a flow direction in the fluid line. The second outlet of the adapter body includes a first end and a second end extending from the first end along a second flow direction of the second outlet, and further includes an adapter bead formed around the first end of the second outlet. The channel of the mating block includes a stepped annular surface being faced perpendicularly to a longitudinal axis of the channel and having a larger diameter than the channel to receive and support the adapter bead of the adapter body when the adapter body is coupled to the channel of the mating block.

According to a further aspect of the present disclosure, the adapter body further includes at least one circular bead radially formed around the adapter body such that the at least one circular bead is spaced apart from the adapter bead along a second flow direction of the second outlet. The adapter body further includes at least one rib formed and connected between the adapter bead and the circular bead to prevent creep of the adapter body.

According to a further aspect of the present disclosure, the channel of the mating block further includes a side opening formed on a lateral wall of the channel to receive the first outlet of the adapter body when the adapter body is coupled to the channel of the mating block. A seal washer (or sealing ring) is placed around the second outlet of the adapter body and configured for sealing in the fluid line when the second outlet is connected with one of the tubes or attached to one of the fuel line system components. Further, another tube is inserted into the first outlet of the adapter body and connected to the adapter body in a firmly bonded manner such as a welding.

According to a further aspect of the present disclosure, a portion of the sealing ring retained in the second outlet of the adapter body is placed in a stepped annular surface of the mating block such that the portion of the sealing ring and the adapter bead are located inside the channel of the mating block.

According to a further aspect of the present disclosure, the mating block further includes at least one through hole for receiving a fastening element to attach the mating block to the fluid line system. The adapter body is made from a plastic material, and the mating block is formed of a metallic or polymer material.

According to another aspect of the present disclosure, a connection arrangement device for making a secure connection with at least one tube in a fluid line includes at least one adapter body having a passage bore forming a fluid channel with at least two outlets and a mating block formed with an insert and an outer body. The adapter body includes a retention feature and the mating block has at least one channel receiving the adapter body and a mating feature formed in the channel. The retention feature of the adapter body is engaged with the mating feature of the mating block such that the adapter body is securely retained in the channel of the mating block.

According to a further aspect of the present disclosure, the adapter body includes an adapter bead positioned on an upper surface of the mating block when the adapter body is coupled with the mating block. The retention feature extends from a second side of the adapter bead such that the retention feature is securely engaged with a groove formed in the mating feature when the adapter body is coupled with the mating block.

According to another aspect of the present disclosure, a method of a connection arrangement with at least one tube for making a secure connection in a fluid line, the method comprises of the steps of providing at least one adapter body having a first outlet and a second outlet, providing a mating block having at least one channel and at least one through hole, inserting an end of the tube into the first outlet and connecting the inserted tube with the adapter body in a firmly bonded manner, and coupling the adapter body with the connected tube to the at least one channel of the mating block such that the adapter body is engaged with the channel of the mating block. Further, the step of providing the mating block includes the step of providing an insert and an outer body overmolded to the insert.

According to a further aspect of the present disclosure, the method includes the step of installing a seal washer in the second outlet of the adapter body by an interference-fit with or placing around the second outlet of the adapter body to connect with another tube, and also includes the step of mounting the mating block engaged with the adapter body in the fluid line by a fastening element via the through hole of the mating block.

Further details and benefits will become apparent from the following detailed description of the appended drawings. The drawings are provided herewith purely for illustrative purposes and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 5A shows a side view of another retention feature formed in the adapter body of FIG. 2A, FIG. 5B shows a side view of another retention feature formed in the adapter body of FIG. 2B, and FIG. 5C shows a perspective view of another mating feature of the mating block of FIG. 1A;

Figure 1A:
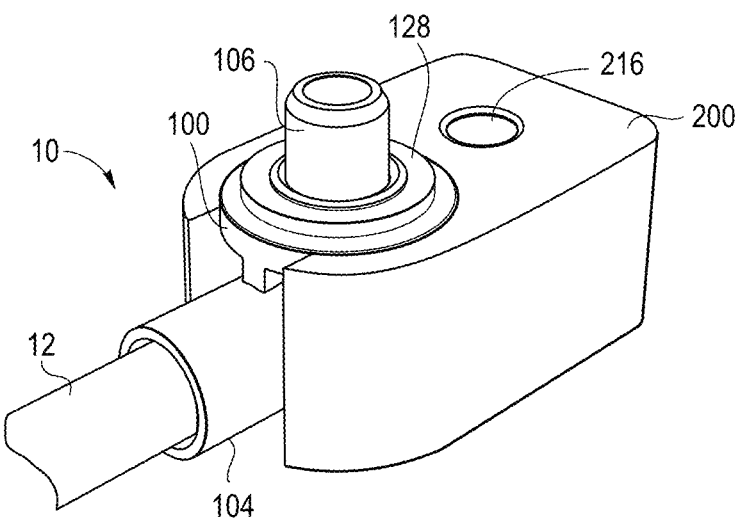
FIG. 1A shows a perspective view of a connection arrangement device including an adapter body and a mating block having one channel in accordance with an exemplary form of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

A connection arrangement device of the present disclosure is illustrated in connection with a fluid line system such as an air conditioning system or a cooling system, etc. in a motor vehicle. As an example, the connection arrangement device of the present disclosure is used in an air conditioning system having a compressor, a condenser, heat exchangers, evaporators, and also midline connections. In particular, the connection arrangement device is provided for the air conditioning system having a low weight, and having a durable and tight connection of components of the air conditioning system in the motor vehicle. However, the connection arrangement device of the present disclosure is not limited and is also used in other fluid line systems such as cooling systems (e.g., coolant circuits), valve units, pump units, etc.

Figure 1B:
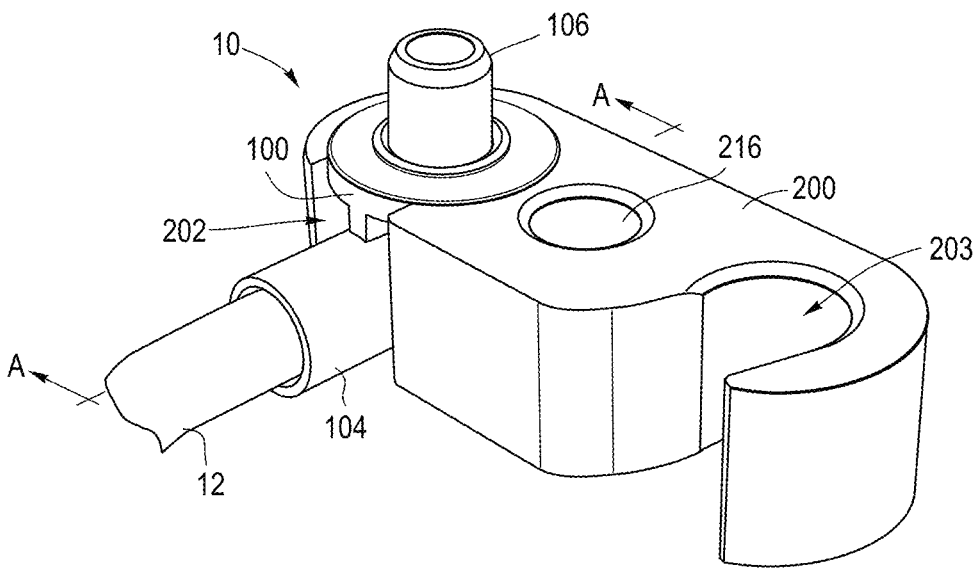
FIG. 1B shows a perspective view of a connection arrangement device including an adapter body and a mating block having two channels in accordance with another exemplary form of the present disclosure.
Figures 4A, 4B:
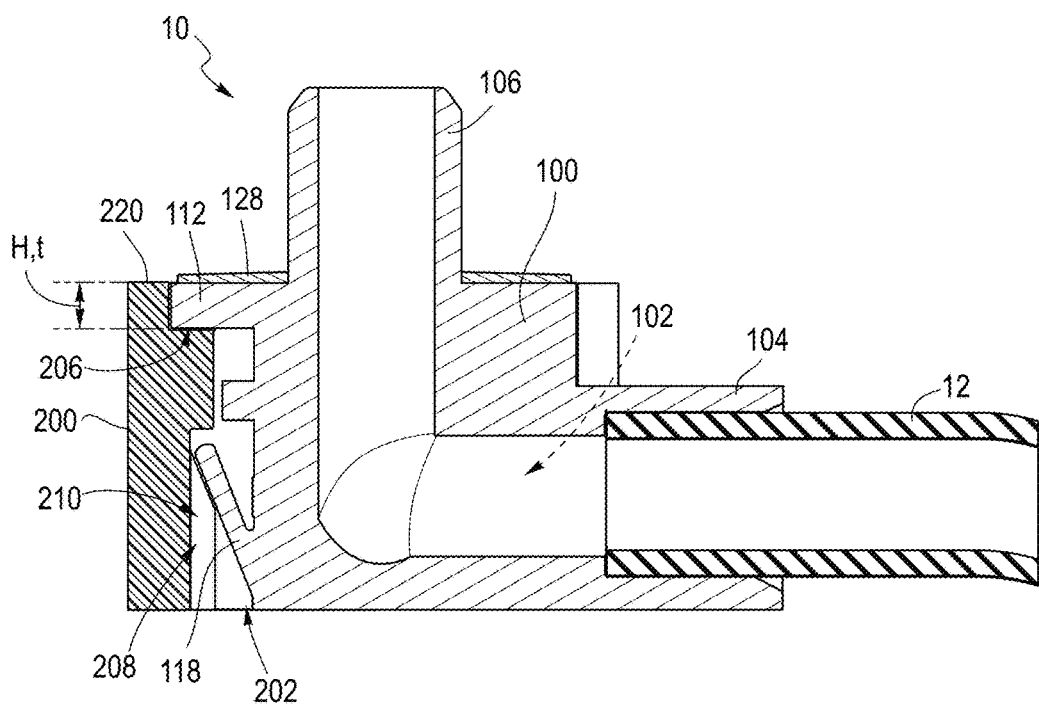
FIG. 4A shows a side sectional view of the connection arrangement device, taken along line A-A in FIG. 1B.
FIG. 4B shows a side sectional view of a connection arrangement device in accordance with another exemplary form of the present disclosure.

FIGS. 1A and 1B show the connection arrangement device 10 having at least one adapter body 100 and a mating block 200 coupled with the adapter body 100. Generally, the connection arrangement device 10 is fixed to a fluid line system such as an air conditioning system (not shown) by a fastening element for a fluid line such as a refrigerant in an automotive vehicle. As shown in FIGS. 1A and 1B, the adapter body 100 has a passage bore 102 formed as a fluid channel (see FIG. 4A), and includes at least two outlets such as a first outlet 104 and a second outlet 106 formed at each end of the adapter body 100 such that the first outlet 104 communicates with the second outlet 106 through the fluid channel 102 (see also FIGS. 2A and 2B). Each of the first and second outlets 104 and 106 is generally connected with a tube or hose for making a secure connection in the fluid line system. In another approach, the adapter body 100 includes three and more outlets such that it is not limited to two outlets. As shown in FIG. 4A, the first outlet 104 of the adapter body 100 is in a form of a hollow-cylindrical reception to receive the tube 12 to be connected by welding, in particular by a laser welding such that the tube 12 is inserted into the first outlet 104, and is securely connected to the adapter body 100. In addition, in FIGS. 1A and 1B, the mating block 200 is formed with at least one channel 202 receiving the adapter body 100 such that the adapter body 100 is coupled with the mating block 200.

Figure 2A:
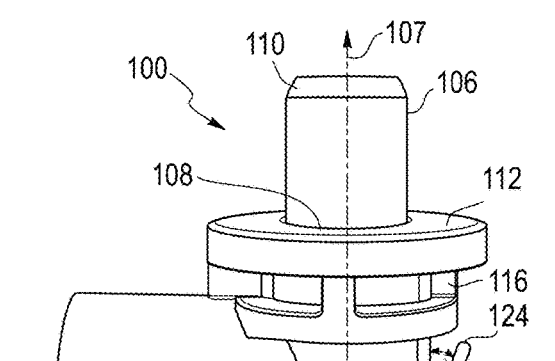
FIG. 2A shows a side view of the adapter body in the connection arrangement device of FIG. 1A.

In FIG. 2A, the adapter body 100 includes the first outlet 104 and the second outlet 106 which are angled by 90 degrees for changing a flow direction. In accordance with other forms of the present disclosure, the angle formed by the first outlet 104 and the second outlet 106 may be changed to create a desired flow direction such as 45 degrees, 90 degrees, or 180 degrees (a straight-flow direction), etc. As shown in an example of FIG. 2A, a first flow direction 105 is defined along the first outlet 104 and a second flow direction 107 is defined along the second outlet 106 such that the first flow direction 105 and the second flow direction 107 are perpendicular because the first outlet 104 and the second outlet 106 are angled by 90 degrees.

In FIG. 2A, the second outlet 106 has a first end 108 and a second end 110 extending from the first end 108 along the second flow direction 107. Further, the adapter body 100 includes an adapter bead 112 and at least one circular bead 114 radially formed around the adapter body 100. The adapter bead 112 is formed around the first end 108 of the second outlet 106 and the at least one circular bead 114 is formed to be spaced from the adapter bead 112 along the second flow direction 107. In addition, as shown in FIG. 2A, the adapter body 100 includes at least one rib 116, which is formed between the adapter bead 112 and one of the circular beads 114, and configured for preventing creep of the adapter body 100 when the connection arrangement device 10 is mounted to the air conditioning system, which is operated in the vehicle.

Figure 2B:
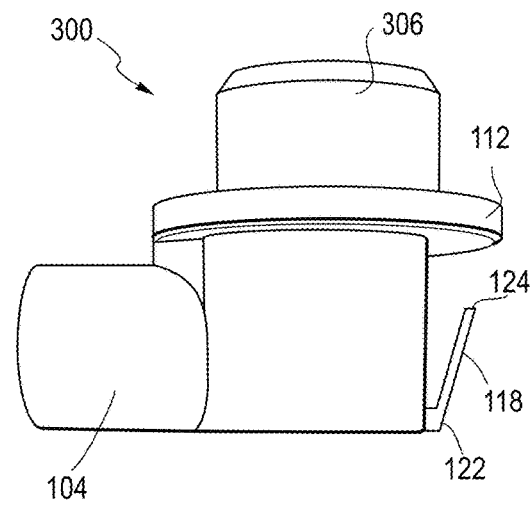
FIG. 2B shows a side view of an adapter body in accordance with another exemplary form of the present disclosure.

FIG. 2B shows a second embodiment of an adapter body 300. The adapter body 300 is formed with a second outlet 306 having a larger diameter than the second outlet 106 of the adapter body 100 such that the adapter body 300 can be connected with one of the tubes having a larger diameter size. Further, the second embodiment of the adapter body 300 is formed without the circular beads 114 and the ribs 115 formed in the first embodiment of the adapter body 100. As shown in FIGS. 2A and 2B, the circular beads 114 formed in the first embodiment of the adapter body 100 are not necessary for the second embodiment of the adapter body 300 coupling with a second channel 203 in the mating block 200 (see FIG. 3B) because the adapter body 300 has a enough size to fit within the second channel 203, which is formed with a larger size than the first channel 202. Compared to the adapter body 300 of FIG. 2B, the structural size such as a wall thickness of the adapter body 100 in FIG. 2A can be decreased for better injection molding such that the smaller size of the adapter body 100 increases the dimensional stability of the adapter body 100 during the injection molding process. Accordingly, in the adapter body 100 of FIG. 1A, the circular beads 114 with the ribs 116 are necessary to increase an outer diameter enough for fitting within the channel 202 of the mating block 200 and also the structural strength of the adapter body 100 because the wall thickness of the adapter body 100 is decreased.

Figure 2C:
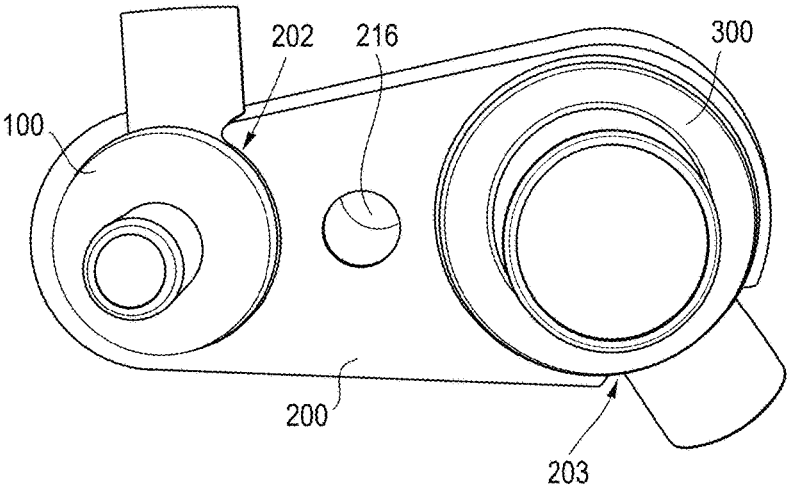
FIG. 2C shows a top view of a connection arrangement device having one mating block and two adapter bodies of FIGS. 2A and 2B.

FIG. 2C shows an example of the connection arrangement device 10 having two adapter bodies 100 and 300, and the mating block 200 formed with two channels 202 and 203. The first channel 202 is a smaller size than the second channel 203 such that the first channel 202 receives the first adapter body 100 and the second channel 203 receives the second adapter body 300. Accordingly, due to the different sizes of the adapter bodies 100 and 300, the connection arrangement device 10 can be used with the tubes 12 having different sizes in the fluid line system.

Referring back to FIGS. 2A and 2B, the adapter bodies 100 and 300 include a retention feature 118 formed with a beam type, which has a fixed end 122 attached to each of the adapter bodies 100 and 300, and a free end 124 extending from the fixed end 122. Since both adapter bodies 100 and 300 have the identical retention feature 118, the retention feature 118 formed in the adapter body 100 will be illustrated hereinafter. In FIGS. 2A and 2B, the free end 124 of the beam type retention feature 118 extends from the fixed end 122 with an angle 126 relative to the second flow direction 107, and due to the angled retention feature 118, the adapter body 100 interacts with the mating block 200 and also is engaged with the mating block 200 (see FIG. 4A).

Each of the adapter bodies 100 and 300 is preferably made from a plastic material. In particular, the adapter body 100 and 300 is formed of polymer materials such as polyamide (PA), for example polyamide 612 (PA 612). Also, to increase the strength and/or mechanical stability, the plastic material can be provided with fiber reinforcement such as glass fibers such that the adapter body 100 and 300 is formed with a pressure-resistant plastic material. Further, it is also possible to have a resin-based plastic material. The resin-based plastic materials result in hard, glass-like components, which are firmly three-dimensionally cross-linked via chemical bonds. This type of materials have a high thermo-mechanical strength in conjunction with a low density. In addition, the tube 12 combined with the adapter body 100 in the connection arrangement device 10 is also made from a plastic material, which is selected from the similar materials of the adapter body 100, for example polyamide (PA). However, even though the polyamide (PA) is used for both the adapter body 100 and 300, and the tube 12, each of the polyamide (PA) materials used in both parts might be different. In the fluid line system, the tube 12 can be a single or multilayer tube, which is generally made of Polyamide (PA 6, PA 12, PA 612, semi-aromatic polyamide (PA 9T), HDPE, PP, etc.), which is weldable with the adaptor body. However, the adaptor body is generally made of PA12 (with max 30% glass fiber reinforcements), PPA (Polyphthalamide) or PP (Polypropylene). This results in comparable mechanical and chemical properties.

Figure 3A:
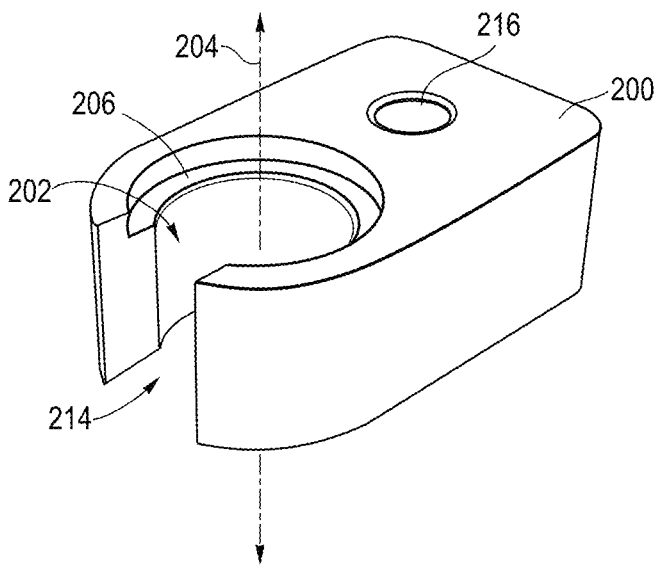
FIG. 3A shows a perspective view of the mating block of FIG. 1A.
Figure 3B:
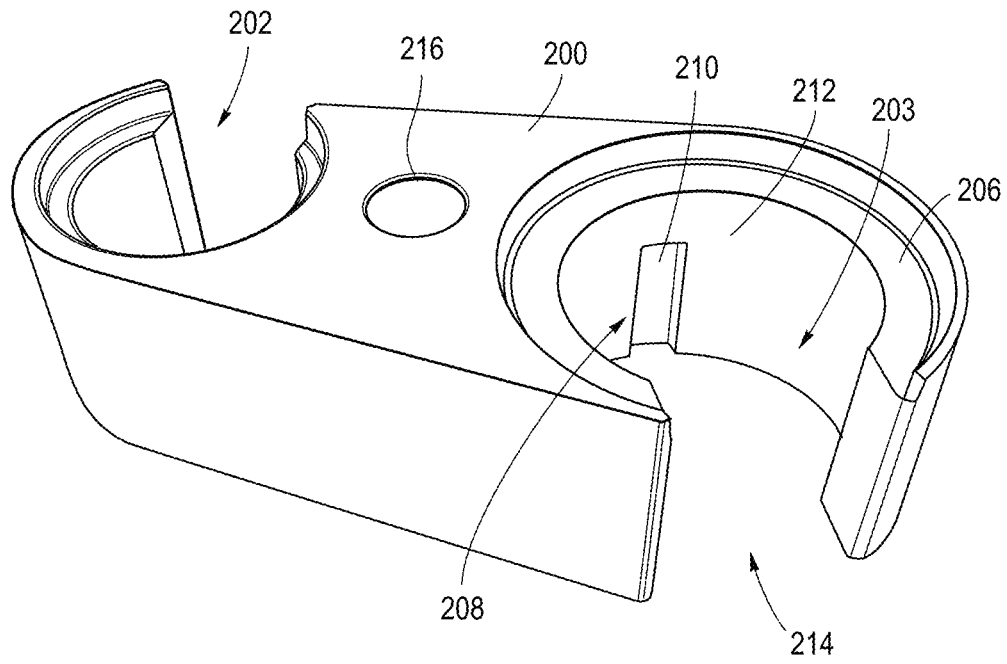
FIG. 3B shows a perspective view of the mating block of FIG. 1B.

FIGS. 3A and 3B show the mating block 200 having at least one channel 202 formed along a longitudinal axis 204 to receive and couple with the adapter body 100. For example, FIG. 3A shows the mating block 200 having one channel 202 and FIG. 2B shows the mating block 200 having two channels 202 and 203. As shown in FIGS. 3A and 3B, each channel 202 and 203 includes a stepped annular surface 206 to receive and support the adapter bead 112 of the adapter body 100 when the adapter body 100 is coupled with the mating block 200. The stepped annular surface 206 has a larger diameter than the channel 202. In addition, as shown in FIG. 3B, the mating block 200 includes a mating feature 208, which is configured to interact with the retention feature 118 of the adapter body 100. The mating feature 208 of the mating block 200 is formed as a groove 210 on an inner surface 212 of the channel 202 along the longitudinal axis 204 such that the retention feature 118 of the adapter body 100 is engaged with the channel 202 of the mating block 200 (see FIGS. 4A and 4B).

As shown in FIGS. 4A and 4B, the retention feature 118 of the adapter body 100 interacts with the mating feature 208 of the mating block 200 such that the adapter body 100 is retained within the channel 202 of the mating block 200. Further, the stepped annular surface 206 has a depth H to receive the adapter bead 112 of the adapter body 100. As shown in FIG. 4A, in an approach, the depth H of the stepped annular surface 206 is the same as a thickness t of the adapter bead 112 such that an upper surface 220 of the mating block 200 and a first surface 111 of the adapter bead 112 formed in the adapter body 100 are flush. Accordingly, a seal washer (or a sealing ring) 128 retained around the second outlet 106 is placed on the first surface 111 of the adapter bead 112 and hence lies over the upper edge of the mating block 200. As shown in FIG. 4B, in another approach, the depth H of the stepped annular surface 206 is larger than the thickness t of the adapter bead 112 such that the stepped annular surface 206 of the mating block 200 receives the adapter bead 112 and also a portion of the seal washer 128 retained in the second outlet 106 formed in the adapter body 100. Accordingly, at least the portion of the seal washer (or sealing ring) 128 located inside the mating block 200 and the other portion of the seal washer (or sealing ring) 128 projects slightly above an upper surface 220 of the mating block 200. As shown in an example of FIG. 4B, the seal washer 128 is slightly compressed and configured to seal a leakage of the connection when the connector arrangement device 10 is securely attached to one of the fluid line system components 22 (see FIG. 7C) because the portion of the seal washer 128 is located inside the mating block 200. Accordingly, the pressure onto the seal washer 128 is sufficient for sealing when the mating block 200 is tightly screwed with the fluid line system component 22. Namely, when an axial force (e.g. downward on the page in FIG. 4B) is placed upon the seal washer 128, the seal washer will compress vertically and expand radially (due to the elastic nature of the material of the seal washer) thereby forming a seal with the tube or component that is pressed onto the seal washer 128 and outlet 106. However, as shown in FIG. 4B, the seal washer 128 expanded radially is not touched to an interior surface of the stepped annular surface 206 such that the seal washer 128 further reduces the risk of leakage due to the deformation and/or distortion of the seal washer 128.

Referring back to FIGS. 3A and 3B, each channel 202 and 203 of the mating block 200 further includes a side opening 214 formed on a lateral surface of the channel 202 and 203 along the longitudinal axis 204 such that the side opening 214 of the mating block 200 is configured to receive the first outlet 104 of the adapter body 100 when the adapter body 100 is coupled with the mating block 200. As shown in the examples of FIGS. 1A and 1B, due to the side opening 214 of the mating block 200 along the longitudinal axis 204, each of the adapter bodies 100 and 300 having the angled outlets 104 and 106 is coupled with the mating block 200 to change in a desired flow direction such as 90 degrees. The mating block 200 further includes at least one through hole 216 for mounting and fixing to the fluid line system by a fastening element such as a screw. Further, the mating block 200 is made of a metallic material such as aluminum or a polymer material. In particular, the material of the mating block 200 is rigid and has a high stress capacity.

FIGS. 5A and 5B show another example of the retention feature 118 formed in each of the adapter bodies 100 and 300. Since another retention features 118 in both adapter bodies 100 and 300 are also identical, the another retention feature 118 of the adapter body 100 will be illustrated hereinafter. In each of the adapter bodies 100 and 300, the retention feature 118 is formed as at least one protrusion 130 such as an annular shape generally protruding from the outer surface of the adapter body 100. For example, in FIG. 5A, the annular protrusion 130 protrudes from one of the circular beads 114 formed around the adapter body 100, and in FIG. 5B, the annular protrusion 330 protrudes from the outer surface 332 of the adapter body 300. In accordance with other embodiments of the present disclosure, the retention feature 118 of the adapter body 100 may be formed with other shapes such as a semi-annular protrusion or a peripheral protrusion (e.g., a rectangular shape or a hexagonal shape) protruding from the outer surface of the adapter body 100.

FIG. 5C shows another example of the mating feature 208 formed in the mating block 200. The mating feature 208 is formed as at least one hole 218 on the lateral wall of the channel 202 to interact and engage with the annular protrusion 130 of the adapter body 100 when the adapter body 100 is coupled to the mating block 200 such that the adapter body 100 is retained within the channel 202 of the mating block 200.

Figure 6A:
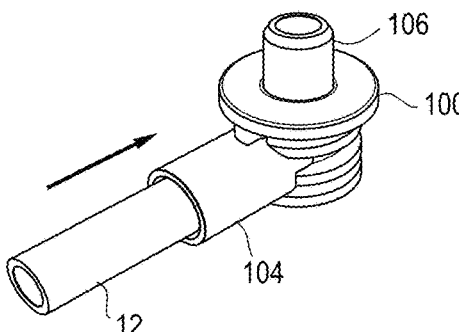
FIGS. 6A-6D show an assembly process of the connection arrangement device of FIG. 1A.

FIGS. 6A-6D show an assembly process of the connection arrangement device 10 having the adapter body 100 and the mating block 200, which is connected with at least one tube or hose 12. In FIG. 6A, a plastic or metallic tube 12 is inserted into and connected to the adapter body 100 in a firmly bonded manner. The first outlet 104 of the adapter body 100 receives the tube 12, which communicates with the passage bore (fluid channel) 102 of the adapter body 100, and the inserted tube 12 is securely bonded to the adapter body 100 by an adhesive. For example, the bonded connection is provided by welding methods such as a spin welding, an ultra-sonic welding, an induction welding, a solvent welding, or a laser welding. In particular, for the laser welding, the adapter body 100 may be made of a laser-transparent material and also the materials of the adapter body 100 and the tube 12 is selected with regard to weldability. Further, the bonded connection is provided by other bonding methods such as a gluing.

Figure 6B:
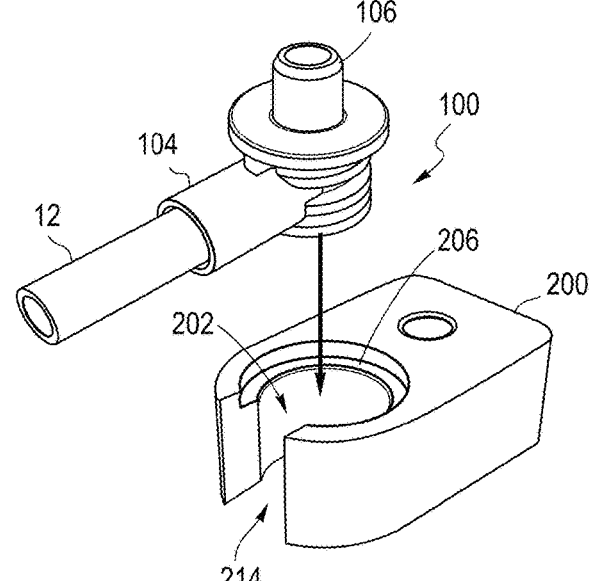
Figure 6C:
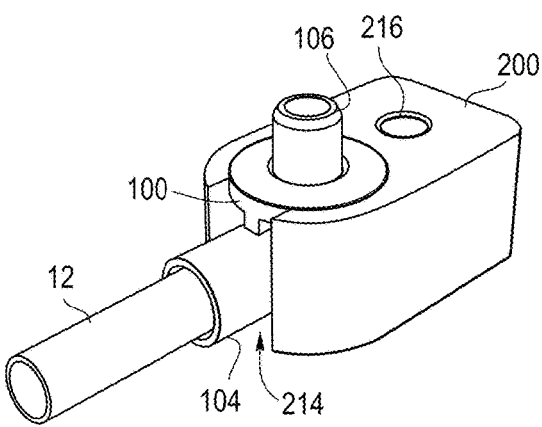

In FIG. 6B, the adapter body 100 with the inserted tube 12 is coupled to the mating block 200 such that the retention feature 118 of the adapter body 100 interacts with the mating feature 208 of the mating block 200. Accordingly, as shown in FIG. 6C, the adapter bead 112 of the adapter body 100 is supported by the stepped annular surface 206 of the mating block 200 and the retention feature 118 of the adapter body 100 is engaged with the mating feature 208 of the mating block 200 such that the adapter body 100 is retained within the channel 202 of the mating block 200.

Figure 6D:
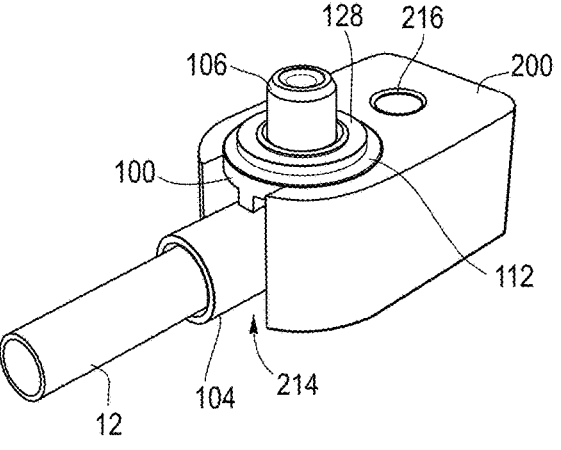

In FIG. 6D, the seal washer 128 is pushed onto the second outlet 106 of the adapter body 100 such that the seal washer 128 is placed around the second outlet 106 or retained around the second outlet 106 by an interference-fit manner (see also FIG. 1A). Accordingly, the seal washer 128 is configured to seal in the fluid line when the second outlet 106 is connected with another tube or hose, or fastened via the through hole 216 of the mating block 200 to a fluid line system (not shown). The seal washer 128 could be a sealing ring of an elastomer material, or could be an elastomer metal composite seal washer (slim line seal washer). In another approach, the seal washer 128 comprises an annular elastomer portion which is attached to a support ring of the metallic material. The support ring receives the axially acting contact forces and prevents the elastomer portion from wearing prematurely as a result of excessive deformation. The elastomer portion provides the sealing of the gap between the surface of the adapter bead 112 and the end face of the another tube or the fluid line system. However, in accordance with other embodiments of the present disclosure, the feature will also be used on radial connection that utilize an O-ring, instead of the sealing washer. Further, the connection arrangement device 10 of the present disclosure is securely attached or fixed to one of the fluid line system components 22 by the fastening means such as a screw (see FIG. 7B), and, as described above, another tube is connected to the second outlet 106 of the adapter body 100 for making a secure connection in a fluid line system.

Figure 7A:
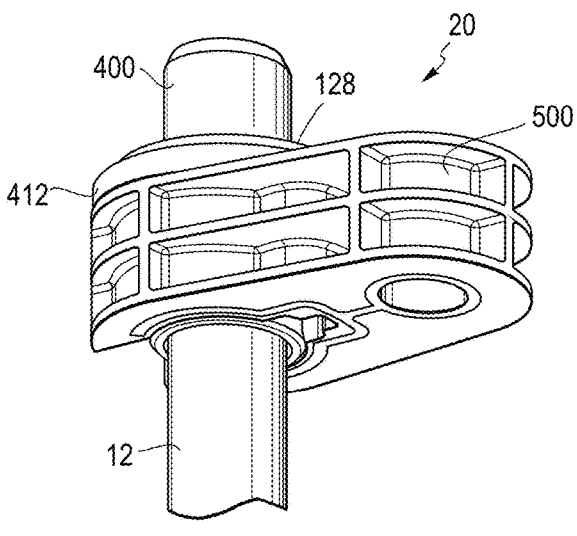
FIG. 7A shows a perspective view of a connection arrangement device including an adapter body and a mating block having one channel in accordance with another exemplary form of the present disclosure.
Figure 7B:
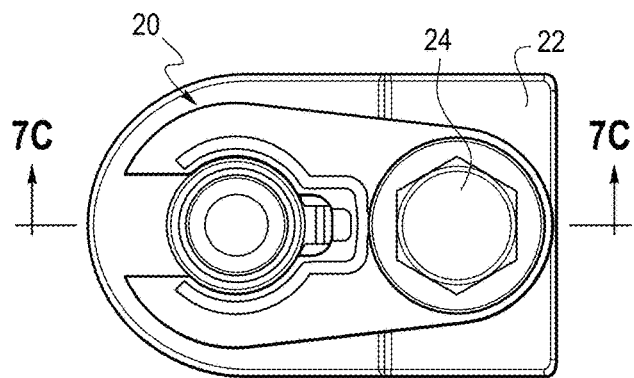
FIG. 7B shows a plan view of the connection arrangement device of FIG. 7A attached to a fluid line system.
Figure 7C:
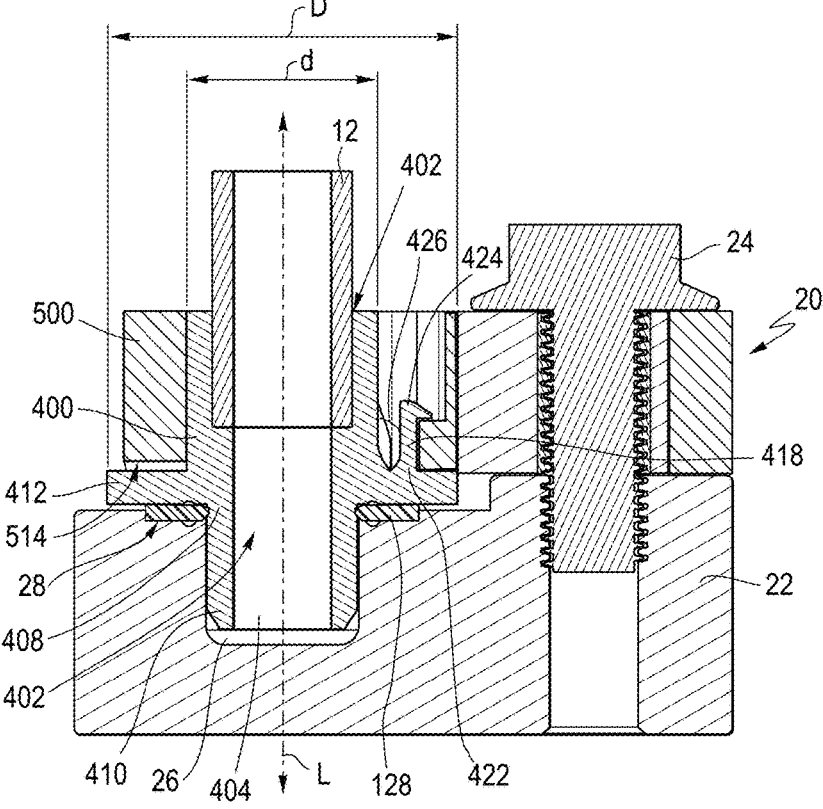
FIG. 7C shows a side sectional view of the connection arrangement device attached to the fluid line system, taken along line 7C-7C of FIG. 7B.

FIG. 7A shows another exemplary embodiment of a connection arrangement device 20 having an adapter body 400 and a mating block 500 of the present disclosure. FIG. 7B shows the connection arrangement device 20 securely attached to a part or component 22 of the fluid line system by a fastening element 24 by way of example, and FIG. 7C shows a cross-sectional view of the connection arrangement device 20 fixed to the fluid line system component 22. In FIGS. 7A-7C, the connection arrangement device 20 includes the adapter body 400 and the mating block 500. However, as shown in another exemplary embodiment of FIG. 2C above and applicable here, two or more adapter bodies can be coupled with the mating block having two or more channels.

As shown in FIG. 7C, the adapted body 400 has a passage bore 402 formed as a fluid channel and includes at least two outlets such as a first outlet 404 and a second outlet 406 such that the first outlet 404 communicates with the second outlet 406 through the fluid channel 402. In another approach, the adapter body 400 includes three and more outlets such that it is not limited to two outlets. Each of the first and second outlets 404 and 406 is generally connected with a tube or hose 12 for making a secure connection in the fluid line system component 22. As shown in FIG. 7C, the first outlet 404 of the adapter body 400 is in a form of a hollow-cylindrical reception to receive the tube 12 to be connected by welding, in particular by a laser welding such that the tube 12 is inserted into the first outlet 404 and securely connected to the adapter body 100.

In FIG. 7C, the adapter body 400 includes the first outlet 404 and the second outlet 406 arranged in a straight flow direction, defined as a longitudinal direction L. However, as shown in FIG. 4A, the first outlet and the second outlet may be angled to create a desired flow direction such as 90 degrees or 45 degrees. The second outlet 406 has a first end 408 and a second end 410 extending from the first end 408 along the longitudinal direction L. Further, the adapter body 400 includes an adapter bead 412 radially formed around the first end 408 of the second outlet 406, which is similar to the exemplary embodiments of FIGS. 2A and 2B, and also the adapter body 400 is formed of a plastic material which is the same as the adapter body 100 and 300 described above. The adapter body 400 of the third embodiment is essentially the same as the adapter body 100 and 300 (see FIGS. 2A and 2B) described above with exception of the flow direction of the first and second outlets 404 and 406, and a retention feature 418 arranged in a different location (see also FIG. 7C).

In particular, as shown in FIG. 7C, the adapter body 400 includes the retention feature 418 having a fixed end 422 and a free end 424 extending from the fixed end 422. The retention feature 418 is formed with a beam type and generally identical to the retention feature 118 of the adapter body 100 and 300 described above, but in FIG. 7C of the present disclosure, the fixed end 424 of the retention feature 418 is attached to a second side 413 of the adapter bead 412, which is different from the adapter body 100 and 300 described above. Further, the free end 424 of the retention feature 418 extends from the fixed end 422 with an angle 426 relative to the longitudinal direction L. Due to the angled retention feature 418, the adapter body 400 interacts with a mating block 500 and is engaged with the mating block 500 as shown in FIG. 7C.

Figure 8A:
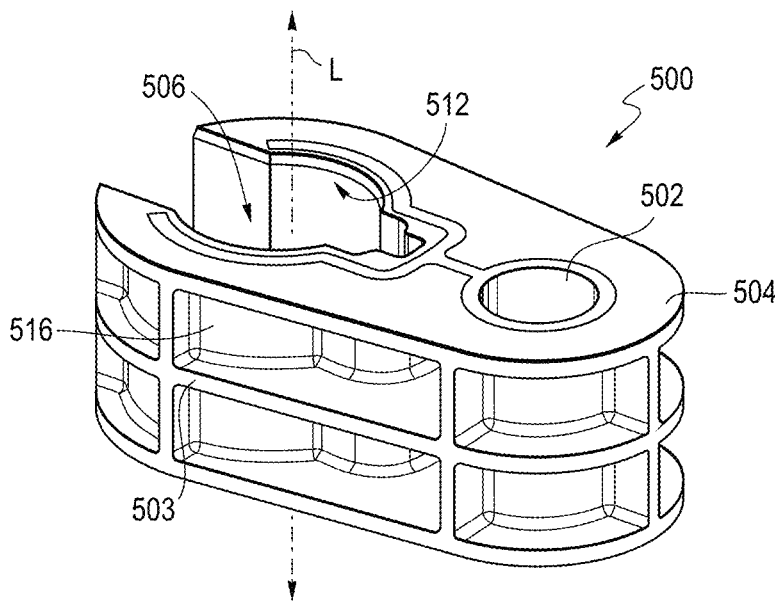
FIG. 8A shows a perspective view of a mating block in accordance with another exemplary form of the present disclosure.
Figure 8B:
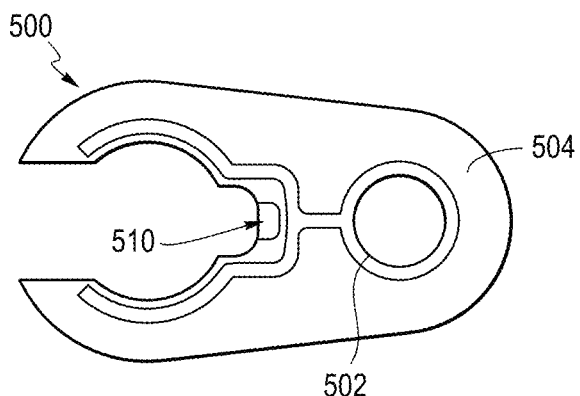
FIG. 8B shows a plan view of the mating block of FIG. 8A.
Figure 8C:
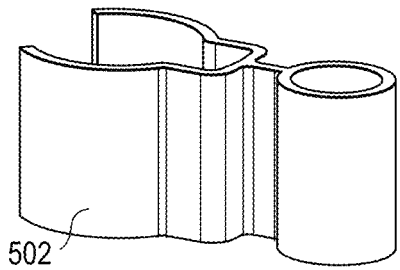
FIG. 8C shows a perspective view of an insert of the mating block of FIG. 8A.

FIGS. 8A-8C show the mating block 500 as another exemplary embodiment of the present disclosure. In FIG. 8A, the mating block 500 is formed with two components having an insert 502 and an outer body 504, and also has at least one channel 506 formed along the longitudinal axis L to receive and couple with the adapter body 400. FIG. 8B shows the insert 502 formed of a metallic material such as an aluminum or a steel by an extrusion process. However, in accordance with other forms of the present disclosure, the insert 502 is made by other processes such as a cutting, machining, etc. FIG. 8C shows the mating block 500 having the outer body 504 formed of a polymer material. Further, the outer body 504 may be overmolded to the insert 502 by a plastic injection mold process. As shown in FIG. 8A, since the mating block 500 is made by the injection molding process, the outer body 506 is formed with a plurality of ribs 503 on the outer radial surface 516 of the outer body 504 to reduce material costs and weight of the connection arrangement device 20. Further, as shown in FIG. 7C, when the fastening element 24 such as a screw is used for the connection arrangement device 20 to securely attach to the fluid line system component 22, the metallic insert 502 of the mating block 500 provides the strength required to support the compressive forces along the longitudinal direction L for sealing between the connection arrangement device 20 and the fluid line system component 22.

Referring back to FIG. 7C, the mating block 500 includes a mating feature 508 configured to interact with the retention feature of 418 of the adapter body 400. The mating feature 508 of the mating block 500 is formed as a groove 510 on an inner surface 512 of the channel 506 along the longitudinal axis L such that the retention feature 418 of the adapter body 400 is engaged with the channel 506 of the mating block 500. The mating block 500 of the present disclosure is essentially the same as the mating block 200 (see FIGS. 3A and 3B) described above with exception of the stepped annular surface 206, the mating block 500 formed with the insert 502 and the outer body 504, and a mating feature 508 arranged in a different location (see also FIG. 7C). In this embodiment, a recess 28 is formed in the system component 22 for receiving the sealing washer 128, although it could also be formed in the underside of the adapter body 400.

In FIG. 7C, the diameter D of the adapter bead 412 is larger than the diameter d of the channel 506 formed in the mating block 500 such that the adapter bead 412 of the adapter body 400 is located on an upper surface 514 of the mating block 500 when the adapter body 400 is securely coupled with the mating block 500. Further, as shown in FIG. 7C, the seal washer 128 is pushed onto the second outlet 406 of the adapter body 400 such that the seal washer 128 is placed around the second outlet 406. Accordingly, the seal washer 128 is configured to seal in the fluid line by locating between the adapter body 400 and the fluid line system component 22 when the second outlet 406 of the adapter body 400 is connected with another tube or hose, or is inserted into an aperture 26 formed in the fluid line system component 22. As with the prior embodiments, the seal washer 128 may be sized and configured such that an axial force on the washer creates a seal with both axially extending surface and radially extending surface of the recess 28, along with the underside of the adapter body 400.

The connection arrangement devices 10 and 20 according to the present disclosure, are suitable for various fluid line systems such as an air conditioning system or a cooling system in motor vehicles. For example, the connection arrangement devices 10 and 20 are suitable for cooling systems of hybrid or electric vehicles having cooling/tempering electronic components such as batteries. Further, the fluid line systems used in the vehicles should be lightweight as much as possible, but the fluid line systems are also provided with stable connections among the components because of the vibrations and shocks while the vehicles are operated. Accordingly, the connection arrangement devices 10 and 20 of the present disclosure make it possible to produce a stable and durable connection with a light weight.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connection arrangement device for making a secure connection with at least one tube in a fluid line, the connection arrangement device comprising:

at least one adapter body having a passage bore forming a fluid channel with at least two outlets, the adapter body including a retention feature formed outside the adapter body;

a mating block formed with at least two components, the mating block having at least one channel receiving the adapter body and including a mating feature formed in the channel, the at least two components being an insert and an outer body, wherein the insert is formed of a metallic material, and the outer body is formed of a polymer material that is overmolded to the insert to form the mating block;

wherein the retention feature of the adapter body is configured to interact with the mating feature of the mating block when the adapter body is coupled to the channel of the mating block such that the adapter body is securely retained within the channel of the mating block.

2. The connection arrangement device of claim 1, wherein the retention feature of the adapter body is formed with a beam having a fixed end attached to the adapter body and a free end extending from the fixed end with an angle from a flow direction of a second outlet of the a least two outlets such that the beam is engaged with the mating feature when the adapter body is retained within the channel of the mating block.

3. The connection arrangement device of claim 2, wherein the mating feature of the mating block is formed as a groove on an inner surface of the channel to receive the beam the adapter body such that the adapter body is securely retained within the channel of the mating block.

4. The connection arrangement device of claim 1, wherein the retention feature of the adapter body includes at least one protrusion formed on an outer surface of the adapter body such that the at least one protrusion is engaged with the mating feature of the mating block when the adapter body is retained within the channel of the mating block.

5. The connection arrangement device of claim 4, wherein the mating feature of the mating block includes at least one hole sized to be engaged with the protrusion of the adapter body such that the adapter body is securely retained within the channel of the mating block.

6. The connecting arrangement device of claim 1, wherein the outer body of the mating block is formed with the mating feature to receive the retention feature of the adapter body.

7. The connection arrangement device of claim 1, wherein the adapter body includes the at least two outlets including a first outlet and a second outlet, and wherein the second outlet of the adapter body includes a first end and a second end extending from the first end along a second flow direction of the second outlet, and further includes an adapter bead formed around the first end of the second outlet.

8. The connection arrangement device of claim 7, wherein the channel of the mating block includes a stepped annular surface being faced perpendicularly to a longitudinal axis of the channel and having a larger diameter than the channel to receive and support the adapter bead of the adapter body when the adapter body is coupled to the channel of the mating block.

9. The connection arrangement device of claim 7, wherein the adapter body further includes at least one circular bead radially formed around the adapter body such that the at least one circular bead is spaced apart from the adapter bead along the second flow direction of the second outlet.

10. The connection arrangement device of claim 9, wherein the adapter body further includes at least one rib formed and connected between the adapter bead and the circular bead to prevent creep of the adapter body.

11. The connection arrangement device of claim 1, wherein the channel of the mating block further includes a side opening formed on a lateral wall of the channel to receive a first outlet of the adapter body when the adapter body is coupled to the channel of the mating block.

12. The connection arrangement device of claim 1, wherein a sealing ring is placed around a second outlet of the at least two outlets of the adapter body and configured for sealing in the fluid line when the second outlet is connected with one of the at least one tube or attached to a fluid line system component.

13. The connection arrangement device of claim 12, wherein a portion of the sealing ring located around the second outlet of the adapter body is placed in a stepped annular surface of the mating block such that the portion of the sealing ring and the adapter bead are located inside the channel of the mating block.

14. The connection arrangement device of claim 1, wherein the adapter body is made from a plastic material.

15. A connection arrangement device for making a secure connection with at least one tube in a fluid line, the connection arrangement device comprising:

at least one adapter body having a passage bore forming a fluid channel with at least two outlets, the adapter body including a retention feature; and a mating block formed with an insert and an outer body, the outer body of the mating block having at least one channel receiving the adapter body and a mating feature formed in the channel, wherein the retention feature of the adapter body is engaged with the mating feature formed in the outer body of the mating block such that the adapter body is securely retained in the channel of the mating block.

16. The connection arrangement device of claim 15, wherein the adapter body includes an adapter bead positioned on an upper surface of the mating block when the adapter body is coupled with the mating block.

17. The connection arrangement device of claim 16, wherein the retention feature extends on a second side of the adapter bead such that the retention feature is securely engaged with a groove formed in the mating feature when the adapter body is coupled with the mating block.

18. A method of a connection arrangement with at least one tube for making a secure connection in a fluid line, the method comprising the steps of:

providing at least one adapter body having at least two outlets;

providing a mating block having at least one channel and at least one through hole, wherein the mating block includes an insert and an outer body overmolded to the insert;

inserting an end of the tube into a first outlet and connecting the inserted tube with the adapter body in a bonded manner; and coupling the adapter body with the connected tube to the at least one channel of the mating block such that the adapter body is engaged with the channel of the mating block, wherein the adapter body includes a retention feature and the mating block includes a mating feature such that the retention feature of the adapter body is engaged with the mating feature of the mating block when the adapter body is coupled with the mating block.

19. The method of claim 18, wherein the adapter body further includes an adapter bead and the mating block further includes a stepped annular surface such that the stepped annular surface of the mating block receives and supports the adapter bead of the adapter body when the adapter body is retained in the channel of the mating block.

20. The method of claim 18, wherein the mating block further includes a side opening formed on a lateral wall of the channel to receive a first outlet of the at least two outlets securely connected with the tube when the adapter body is coupled with the mating block.

* * * * *